United States Patent
Hundemer

(10) Patent No.: US 9,438,944 B1
(45) Date of Patent: *Sep. 6, 2016

(54) SYSTEMS AND METHODS FOR CAUSING A STUNT SWITCHER TO RUN A SNIPE-OVERLAY DVE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,522

(22) Filed: Sep. 30, 2015

Related U.S. Application Data

(63) Continuation of application No. 13/829,368, filed on Mar. 14, 2013, now Pat. No. 9,185,309.

(51) Int. Cl.
| | |
|---|---|
| *H04N 21/234* | (2011.01) |
| *H04N 21/4722* | (2011.01) |
| *H04N 21/647* | (2011.01) |
| *H04N 21/239* | (2011.01) |
| *H04N 21/262* | (2011.01) |
| *H04N 5/268* | (2006.01) |
| *H04N 21/81* | (2011.01) |

(52) U.S. Cl.
CPC ........ *H04N 21/26233* (2013.01); *H04N 5/268* (2013.01); *H04N 21/23424* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 5,485,611 | A | 1/1996 | Astle |
| 5,892,535 | A | 4/1999 | Allen et al. |
| 7,051,354 | B2 | 5/2006 | Mears |
| 8,201,201 | B2 | 6/2012 | Des Jardins |
| 8,259,232 | B2 | 9/2012 | Lino |
| 8,789,124 | B1 | 7/2014 | Malaby et al. |
| 2002/0107940 | A1 | 8/2002 | Brassil |
| 2002/0184047 | A1 | 12/2002 | Plotnick et al. |
| 2003/0126597 | A1 | 7/2003 | Darby et al. |

(Continued)

OTHER PUBLICATIONS

Non-Final Office Action dated Jan. 29, 2016 of U.S. Appl. No. 14/458,789, filed Aug. 13, 2014.

(Continued)

*Primary Examiner* — Brian T Pendleton
*Assistant Examiner* — Jean D Saint Cyr
(74) *Attorney, Agent, or Firm* — McDonnell Boehnen Hulbert & Berghoff LLP

(57) ABSTRACT

Disclosed herein are systems and methods for causing a stunt switcher to run a snipe-overlay video effect (DVE). An example method involves (i) selecting a first log-entry from a traffic log, the first log-entry corresponding to a snipe-overlay DVE, to a snipe video, and to a start time; (ii) selecting a second log-entry from the traffic log, the second log-entry corresponding to a video component (VC) and the start time; (iii) causing the VC to start being channeled through the stunt switcher proximate the start time; (iv) making a determination that a threshold time-period has passed since the start time; and (v) responsive to making the determination (a) causing the snipe video to be sent to the stunt switcher, and (b) causing the stunt switcher to run the snipe-overlay DVE, thereby overlaying the snipe video on the VC as the VC is being channeled through the stunt switcher.

31 Claims, 10 Drawing Sheets

(56) References Cited

U.S. PATENT DOCUMENTS

| | | | |
|---|---|---|---|
| 2003/0146915 A1 | 8/2003 | Brook et al. | |
| 2003/0188321 A1 | 10/2003 | Shoff et al. | |
| 2005/0229227 A1 | 10/2005 | Rogers | |
| 2006/0143650 A1 | 6/2006 | Tanikawa et al. | |
| 2007/0067800 A1 | 3/2007 | Wachtfogel et al. | |
| 2007/0143786 A1 | 6/2007 | Deitsch et al. | |
| 2007/0162951 A1 | 7/2007 | Rashkovskiy et al. | |
| 2007/0192788 A1 | 8/2007 | Danzl et al. | |
| 2007/0261090 A1* | 11/2007 | Miller | H04N 7/17318 725/100 |
| 2008/0010342 A1 | 1/2008 | Gebhardt et al. | |
| 2008/0250447 A1 | 10/2008 | Rowe et al. | |
| 2008/0250448 A1 | 10/2008 | Rowe et al. | |
| 2008/0276269 A1 | 11/2008 | Miller et al. | |
| 2009/0070807 A1 | 3/2009 | Jacobs | |
| 2009/0276805 A1 | 11/2009 | Andrews, II et al. | |
| 2010/0166257 A1 | 7/2010 | Wredenhagen | |
| 2011/0283311 A1* | 11/2011 | Luong | H04N 21/414 725/28 |
| 2011/0321084 A1 | 12/2011 | Takahashi et al. | |
| 2012/0084811 A1 | 4/2012 | Thompson et al. | |
| 2012/0185905 A1 | 7/2012 | Kelley | |
| 2012/0291067 A1 | 11/2012 | Wiles | |
| 2013/0055306 A1 | 2/2013 | Macrae et al. | |
| 2013/0272678 A1 | 10/2013 | Bryan et al. | |
| 2014/0089966 A1 | 3/2014 | Briggs et al. | |
| 2014/0195675 A1 | 7/2014 | Silver | |
| 2014/0259051 A1 | 9/2014 | Strein et al. | |
| 2014/0304367 A1 | 10/2014 | Fletcher | |
| 2014/0317666 A1 | 10/2014 | Chiarulli et al. | |
| 2014/0373044 A1 | 12/2014 | Carrol et al. | |
| 2014/0380394 A1 | 12/2014 | Perron et al. | |

OTHER PUBLICATIONS

Final Office Action dated Mar. 8, 2016 of U.S. Appl. No. 13/829,017, filed Mar. 14, 2013.
Hundemer, Hank J., U.S. Appl. No. 13/828,632, filed Mar. 14, 2013, 41 pages.
Hundemer, Hank J., U.S. Appl. No. 13/828,682, filed Mar. 14, 2013, 40 pages.
Hundemer, Hank J., U.S. Appl. No. 13/828,939, filed Mar. 14, 2013, 47 pages.
Hundemer, Hank J., U.S. Appl. No. 13/829,017, filed Mar. 14, 2013, 45 pages.
Hundemer, Hank J., U.S. Appl. No. 13/829,150, filed Mar. 14, 2013, 41 pages.
Non-final office action dated May 14, 2014 of U.S. Appl. No. 13/828,632, filed Mar. 14, 2013.
Non-final office action dated Mar. 7, 2014 of U.S. Appl. No. 13/828,682, filed Mar. 14, 2013.
Final office action dated Jun. 24, 2014 of U.S. Appl. No. 13/828,682, filed Mar. 14, 2013.
Notice of Allowance dated May 21, 2014 of U.S. Appl. No. 13/828,939, filed Mar. 14, 2013.
Non-final office action dated Jun. 26, 2014 of U.S. Appl. No. 13/829,150, filed Mar. 14, 2013.
SMPTE Recommended Practice, "Implementing Broadcast Exchange Format (BXF)" RP 2021-9-2009, published Aug. 19, 2009, pp. 1-90.
Hundemer, Hank J., U.S. Appl. No. 14/458,789, filed Aug. 13, 2014, 39 pages.
Advisory Action dated Sep. 24, 2014 of U.S. Appl. No. 13/828,682, filed Mar. 14, 2013.
Office Action dated Oct. 6, 2014 of U.S. Appl. No. 13/829,150, filed Mar. 14, 2013.
Non-Final Office Action dated Jan. 5, 2015 of U.S. Appl. No. 13/828,632, filed Mar. 14, 2013.
SMTPE ST 2021-4:2012, "Broadcast Exchange Format (BFX)—Schema Documentation".
SMTPE ST 2021-3:2012, "Broadcast Exchange Format (BFX)—Use Cases", Mar. 14, 2012.
SMTPE ST 2021-1:2012, "Broadcast Exchange Format (BFX)—Requirements and Informative Notes", Mar. 14, 2012.
Hundemer, Hank J., U.S Appl. No. 14/724,469, filed May 28, 2015, 41 pages.
Notice of Allowance dated May 8, 2015 of U.S. Appl. No. 13/828,939, filed Mar. 14, 2013.
Office Action dated Jul. 31, 2015 of U.S. Appl. No. 13/828,632, filed Mar. 14, 2013.
Office Action dated Aug. 25, 2015 of U.S. Appl. No. 13/829,017, filed Mar. 14, 2013.

* cited by examiner

SYSTEMS AND METHODS FOR CAUSING A STUNT SWITCHER TO RUN A SNIPE-OVERLAY DVE

CROSS REFERENCE TO RELATED APPLICATIONS

This application relates to U.S. patent application Ser. No. 13/828,682, entitled "Systems and Methods for Causing a Stunt Switcher to Run a DVE," U.S. patent application Ser. No. 13/829,150, entitled "Systems and Methods for Causing a Stunt Switcher to Run a Bug-Overlay DVE," U.S. patent application Ser. No. 13/828,632, entitled "Systems and Methods for Causing a Stunt Switcher to Run a Bug-Removal DVE," U.S. patent application Ser. No. 13/828,939, entitled "Systems and Methods for Causing a Stunt Switcher to Run a Bug-Overlay DVE with Absolute Timing Restrictions," and U.S. patent application Ser. No. 13/829,017, entitled "Systems and Methods for Causing a Stunt Switcher to Run a Multi-Video-Source DVE," all of which are commonly assigned to the assignee of the present application, are being filed simultaneously with the present application, and are hereby incorporated by reference herein in their entirety.

USAGE AND TERMINOLOGY

Throughout this application, with respect to all reasonable derivatives of such terms, and unless otherwise specified (and/or unless the particular context clearly dictates otherwise), each usage of:

"a" or "an" is meant to read as "at least one."
"the" is meant to be read as "the at least one."
the term "video" refers to any material represented in a video format (i.e., having multiple frames). In some instances, video may include multiple sequential frames that are identical or nearly identical, and that may give the impression of a still image. Video may or may not include an audio portion.
the term "video component" (VC) refers to video that one of ordinary skill in the art would typically consider to be self-contained, and that is typically separately scheduled by a traffic system (also referred to as a scheduling-and-sequencing system) of a television-broadcasting system.

TECHNICAL FIELD

The disclosed systems and methods relate generally to television-broadcasting technology.

BACKGROUND

A television-broadcasting system typically includes a traffic system that performs functions related to broadcast scheduling. For example, the traffic system may facilitate the creation of a traffic-log (log), which is a broadcast schedule for a given station during a given time period. The log may include multiple ordered log entries, each of which may correspond to a VC. Each log entry may also include scheduling data for the video, and therefore the log may generally represent the scheduled sequence of VCs intended to be broadcast during the corresponding time period.

There are several types of VCs, non-limiting examples of which include a show-segment VC, a commercial VC, and a promotion VC. A show-segment VC consists of at least a portion of a show, and potentially one or more commercials. A show may be, for example, an episode of a sitcom, a news program, or a movie. A commercial VC consists of a single commercial. Typically, a television-broadcasting company broadcasts a commercial VC in exchange for payment or other compensation from the provider of the commercial VC. A promotion VC consists of video that promotes something such as an event or another VC. Unlike a commercial VC, the television-broadcasting company typically does not receive a payment or other compensation from a third-party for broadcasting the promotion VC.

The traffic system may communicate with a master control system (MCS), which is the technical hub of a television-broadcasting system and is typically the final point before video is sent to an air-chain system for broadcast. More specifically, the traffic system typically communicates with an automation system of the MCS. The automation system is the logic center of the MCS and may cause the MCS and/or another entity to perform various functions.

Through a communication path, the traffic system may provide the log to the automation system, such that the automation system may traverse and select log entries. The automation system may then cause the MCS and/or another entity to perform certain functions for each selected log-entry at an appropriate time (i.e., based on the corresponding scheduling data). For example, the automation system may cause a recording-and-playout device (RAPD) to retrieve and playout a stored VC such that it may be channeled through one or more entities within the MCS (e.g., routers and switchers), and sent to an air-chain system for broadcast. In another example, the automation system may cause a streaming VC received from a streaming-video source (SVS) to be channeled through the MCS and sent to the air-chain system for broadcast.

In some instances, when video is channeled through the MCS, the video may be channeled through a stunt switcher of the MCS. The stunt switcher performs functions related to video effects (DVE) (sometimes referred to as "stunt work"). For example, the stunt switcher may run a DVE, which dynamically manipulates video that is being channeled through the stunt switcher.

SUMMARY

In one aspect, a method for use in a television-broadcasting system having a stunt switcher is disclosed. The method involves (i) selecting a first log-entry from a traffic-log (log), wherein the first log-entry corresponds to a snipe-overlay digital video effect (DVE) stored in the stunt switcher, to a snipe video, and to a start time; (ii) selecting a second log-entry from the log, wherein the second log-entry corresponds to a video component (VC) and the start time; (iii) causing the VC to start being channeled through the stunt switcher proximate the start time; (iv) making a determination that a threshold time-period has passed since the start time; and (v) responsive to making the determination that the threshold time-period has passed since the start time, (a) causing the snipe video to be sent to the stunt switcher, and (b) causing the stunt switcher to run the stored snipe-overlay DVE, thereby overlaying the snipe video on the VC as the VC is being channeled through the stunt switcher.

In another aspect, another method for use in a television-broadcasting system having a stunt switcher is disclosed. The method involves (i) selecting a first log-entry from a log, wherein the first log-entry corresponds to a snipe-overlay DVE stored in the stunt switcher, to a snipe video, and to a start time; (ii) selecting a second log-entry from the log, wherein the second log-entry corresponds to a VC and the start time; (iii) causing the VC to start being channeled through the stunt switcher proximate the start time; (iv)

causing the snipe video to start being sent to the stunt switcher proximate the start time; and (v) causing the stunt switcher to run the stored snipe-overlay DVE proximate the start time, thereby overlaying the snipe video on the VC as the VC is being channeled through the stunt switcher.

In another aspect, a television-broadcasting system includes a (i) stunt switcher; and (ii) an automation system having a computer-readable medium including a set of program instructions, that when executed by the automation system, cause the automation system to perform a set of functions. The set of functions includes (i) selecting a first log-entry from a log, wherein the first log-entry corresponds to a snipe-overlay DVE stored in the stunt switcher, to a snipe video, and to a start time; (ii) selecting a second log-entry from the log, wherein the second log-entry corresponds to a VC and the start time; (iii) causing the VC to start being channeled through the stunt switcher proximate the start time; (iv) making a determination that a threshold time-period has passed since the start time; and (v) responsive to making the determination that the threshold time-period has passed since the start time, (a) causing the snipe video to be sent to the stunt switcher, and (b) causing the stunt switcher to run the stored snipe-overlay DVE, thereby overlaying the snipe video on the VC as the VC is being channeled through the stunt switcher.

In another aspect, another method for use in a television-broadcasting system having a stunt switcher is disclosed. The method involves (i) selecting a first log-entry from a traffic log, wherein the first log-entry corresponds to a VC and to a first start-time; (ii) selecting a second log-entry from the traffic log, wherein the second log-entry corresponds to a snipe-overlay DVE stored in the stunt switcher, to a snipe video, and to a second start-time; (iii) causing the VC to start being channeled through the stunt switcher proximate the first start-time; (iv) making a determination that a threshold time-period remains before the second start-time; and (v) responsive to making the determination that the threshold time-period remains before the second start-time, causing (a) the snipe video to be sent to the stunt switcher, and (b) causing the stunt switcher to run the stored snipe-overlay DVE, thereby overlaying the snipe video on the VC as the VC is being channeled through the stunt switcher.

DETAILED DESCRIPTION OF THE DRAWINGS

I. Overview

Figure 1:
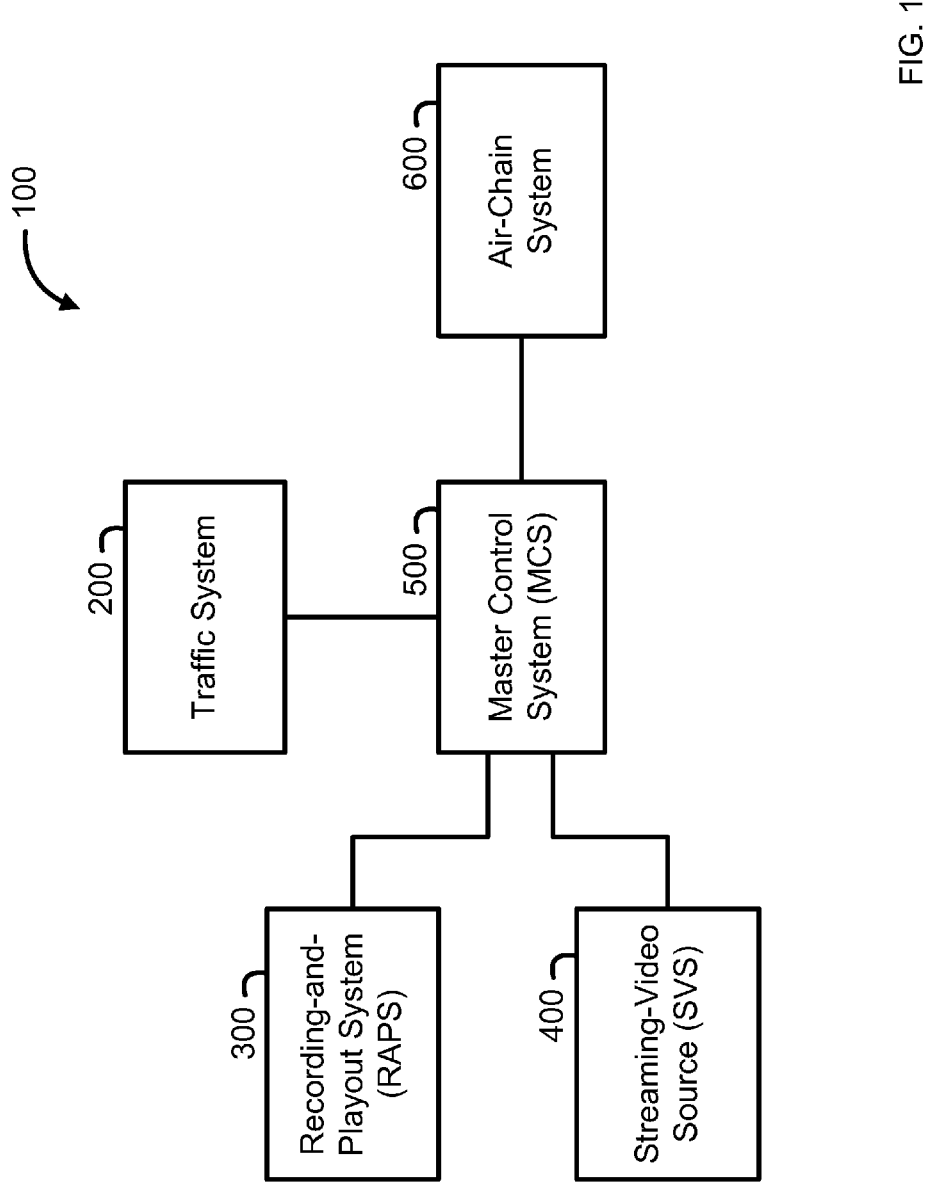
FIG. 1 is a simplified block diagram of an example television-broadcast system.

In the television-broadcasting industry, traffic systems are provided by multiple vendors and often include distinguishing features. However, for a variety of reasons such as to provide compatibility, many traffic systems create logs according to a general industry-wide standard. Likewise, many automation systems are configured to receive and process logs based on this standard. A log entry based on this standard may include certain attributes, including for example a house identifier, a source identifier, a start time, a duration, an episode number, a segment number, and/or an one or more auxiliary notations. These attributes may be generated automatically (e.g., by the traffic system) or may be provided by a user such as a traffic manager.

Typically, a log entry includes one of either a house identifier or a source identifier. If the log entry corresponds to a stored VC, the log entry typically includes a house identifier (sometimes called a "house number"), which identifies the VC. Typically, the house identifier is a unique identifier within a given television-broadcasting system, and maps to a file location in a data storage where the VC is stored. As such, by obtaining the house identifier of a log entry, the automation system may use a mapping table to determine the appropriate file location, and may then retrieve the VC that is stored in that file location. Alternatively, if the log entry corresponds to a streaming VC, the log entry may include a source identifier, which identifies an SVS (e.g., via a mapping table) that provides the streaming VC The start time may indicate the intended start time of a corresponding VC. The start time may be represented as an absolute start time or as a calculated start time. A calculated start time indicates that the start time is when the preceding log entry gets "completed" (i.e., when the VC of the previous log entry has played for its corresponding duration). In some instances, the start time may be unknown until it occurs, and therefore the start time may be represented as a manual start time. In such instances, the corresponding VC is not started until a request is received from a user or a device. The duration indicates the duration of the corresponding VC. In some instances, the duration may be unknown and therefore it may not be included in the log entry. The episode number identifies a particular episode of a show, and the segment number identifies a particular segment number of a show. The episode number and the segment number are included in a log entry that corresponds to a show-segment VC. The one or more auxiliary notations are typically notes that are reviewed by a user (e.g., a traffic manager may provide a note to a master control operator about the corresponding log entry).

The above-described attributes may be stored in corresponding fields in the log entry. For example, the house identifier may be stored in a house-identifier field and the one or more auxiliary notations may be stored in one or more auxiliary-notation fields. Two examples of well-known traffic systems that use the attributes as described above include WO Traffic provided by WideOrbit Inc. of San Francisco, Calif., and OSi-Traffic™ provided by Harris Corporation of Melbourne, Fla.

As discussed above, after an automation system selects a log entry, the automation system may channel the corresponding VC through a stunt switcher, at which time the stunt switcher may run a DVE to dynamically manipulate the video. Running the DVE in this manner typically occurs in response to a user submitting a request to the stunt switcher via a user interface of the stunt switcher.

Submitting such a request to the stunt switcher may be a time-sensitive event. For example, consider a particular type of DVE, namely a snipe-overlay DVE that is configured to overlay video (referred to in this context as "snipe video") on other video a VC (referred to in this context as "underlying video"). The snipe video may for example be a fifteen second partial screen video that serves as an advertisement. In some instances, it may be desired to overlay snipe video only on underlying video that is a show portion of a show-segment VC. Therefore, in one example, a few seconds after a show-segment VC starts, a user may submit a request to the stunt switcher to run the snipe-overlay DVE. Further, proximate the same time, the user may cause the snipe video to be sent to the stunt switcher such that the stunt switcher may use the snipe video in connection with the snipe-overlay DVE (i.e., to overlay the snipe video on the underlying video).

Among other things, this process is manually intensive and is prone to error as it requires a user to constantly monitor the log and the current time to determine when a snipe-overlay DVE should be run before submitting an appropriate request to the stunt switcher and before causing the snipe video to be sent to the stunt switcher. The disclosed systems and methods improve upon this process by configuring a log entry such that the log entry may trigger the sending of a snipe video to a stunt switcher and the stunt switcher's running of a snipe-overlay DVE that uses the snipe video, both at an appropriate time. Accordingly, a user such as a traffic manager may use a log as a mechanism for scheduling snipe-overlay DVEs.

In one example, a log entry includes an identifier that maps to a set of scripts that, when executed, cause an automation system to perform two functions. The first function involves causing a snipe video to be sent to a stunt switcher. The second function involves causing the stunt switcher to run a snipe-overlay DVE. Further, the identifier may be stored in the house-identifier field of the log entry, such that it may be "disguised" as a house identifier as described above. Among other things, this allows the disclosed systems and methods to provide the above-described functionality while adhering to protocols used by many existing traffic systems such as those identified above.

II. Example Television-Broadcasting System

FIG. 1 shows an example television-broadcasting system, generally designated 100. The television-broadcast system 100 may be configured to perform a variety of functions that relate to television broadcasting. The television-broadcasting system 100 may include a traffic system 200, a recording-and-playout system (RAPS) 300, an SVS 400, a MCS 500, and an air-chain system 600. The MCS 500 may serve as the hub of the television-broadcasting system 100 and may connect to each of the traffic system 200, the RAPS 300, the SVS 400, and the air-chain system 600. Generally, the television-broadcasting system 100 may be configured such that video may be sent from the RAPS 300, the SVS 400, or another source, through the MCS 500, and to the air-chain system 600 for broadcast.

A. Traffic System

Figure 2:
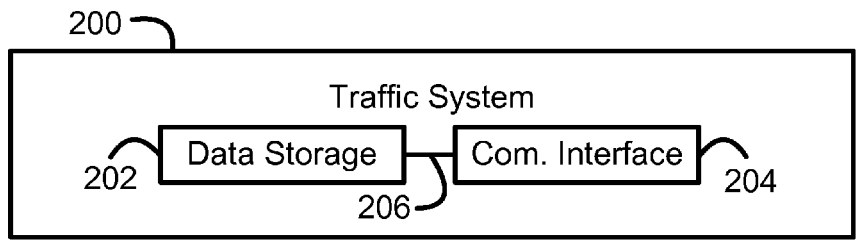
FIG. 2 is a simplified block diagram of an example traffic system.

FIG. 2 shows the traffic system 200 in greater detail. The traffic system 200 may be configured for creating and sending a log to the MCS 500, and may include a data storage 202 and a communication interface 204, both of which may be connected to each other via a connection mechanism (e.g., a bus) 206. The traffic system 200 may be configured to store logs in the data storage 202, and to send the stored logs, via the communication interface 204, to the MCS 500. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
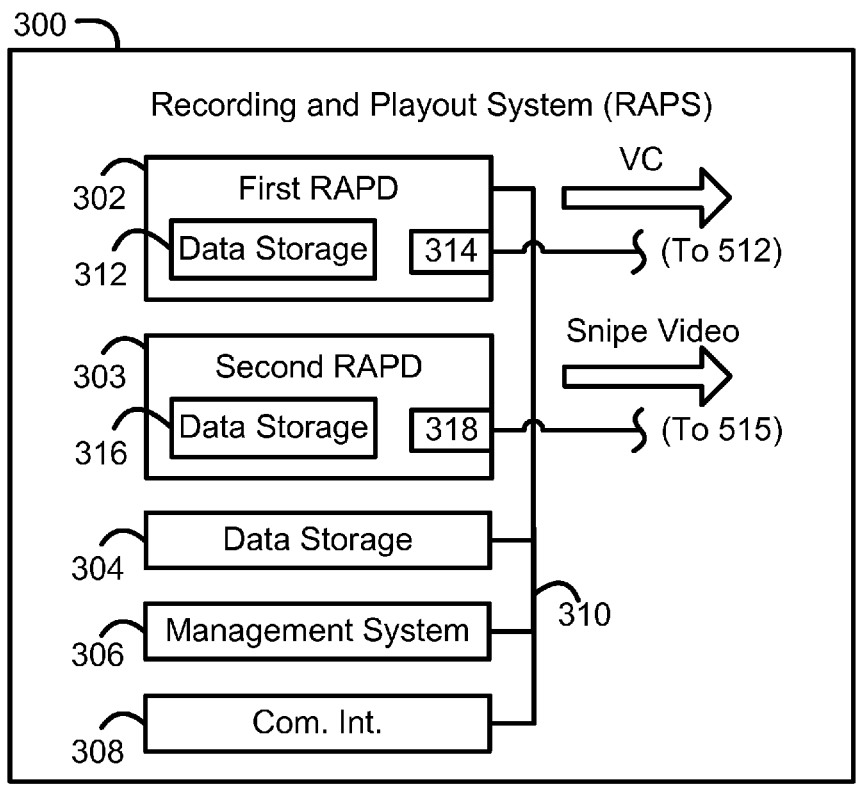
FIG. 3 is a simplified block diagram of an example recording-and-playout system.

FIG. 3 shows the RAPS 300 in greater detail. The RAPS 300 may be configured to record and playout VCs for use by the MCS 500, and may include a first recording-and-playout device (RAPD) 302, a second RAPD 303, a data storage 304, a management system 306, and a communication interface 308, each of which may be connected to each other via a connection mechanism 310.

The first RAPD 302 may be configured to record VCs (e.g., a VC retrieved from the data storage 304) and playout (i.e. send) VCs, via the MCS 500, to the air-chain system 600. The first RAPD 302 may include a data storage 312 and an output 314, both of which may be connected to each other by a connection mechanism (not shown). The data storage 312 may be used for storing VCs that may be sent via the output 314.

The second RAPD 303 may be configured to record snipes videos (e.g., a snipe video retrieved from the data storage 304) and playout (i.e., send) snipe videos to the MCS for use in connection with snipe-overlay DVEs as described below. The second RAPD 302 may include a data storage 316 and an output 318, both of which may be connected to each other by a connection mechanism (not shown). The data storage 316 may be used for storing snipe videos that may be sent via the output 318.

The management system 306 may be configured to manage the RAPDs 302, 303 by organizing and moving VCs or snipe videos back-and-forth between the RAPDs and the data storage 304. The communication interface 308 may connect the RAPS 300 to the MCS 500 or to another entity. An example of a RAPD is the K2 server provided by Grass Valley™ of San Francisco, Calif.

C. SVS

Figure 4:
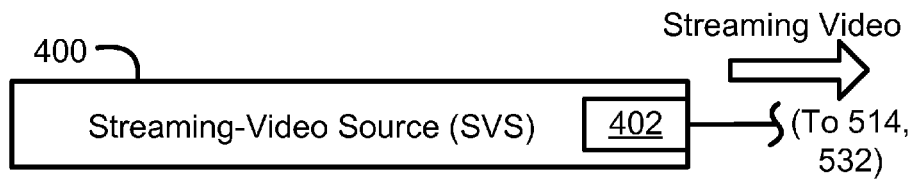
FIG. 4 is a simplified block diagram of an example streaming-video source.

FIG. 4 shows the SVS 400 in greater detail. The SVS 400 is a source configured to send streaming video (e.g., a streaming VC) via an output 402. Streaming video is often received at or shortly before the time when the video is broadcast. In one example, the SVS 400 may send streaming video based on the high-definition serial digital interface (HD-SDI) standard with a data transfer rate of 1.485 Gbps. An example of an SVS is a satellite (e.g., that streams so-called "network television" video) or a newsroom production control system.

D. MCS

Figure 5:
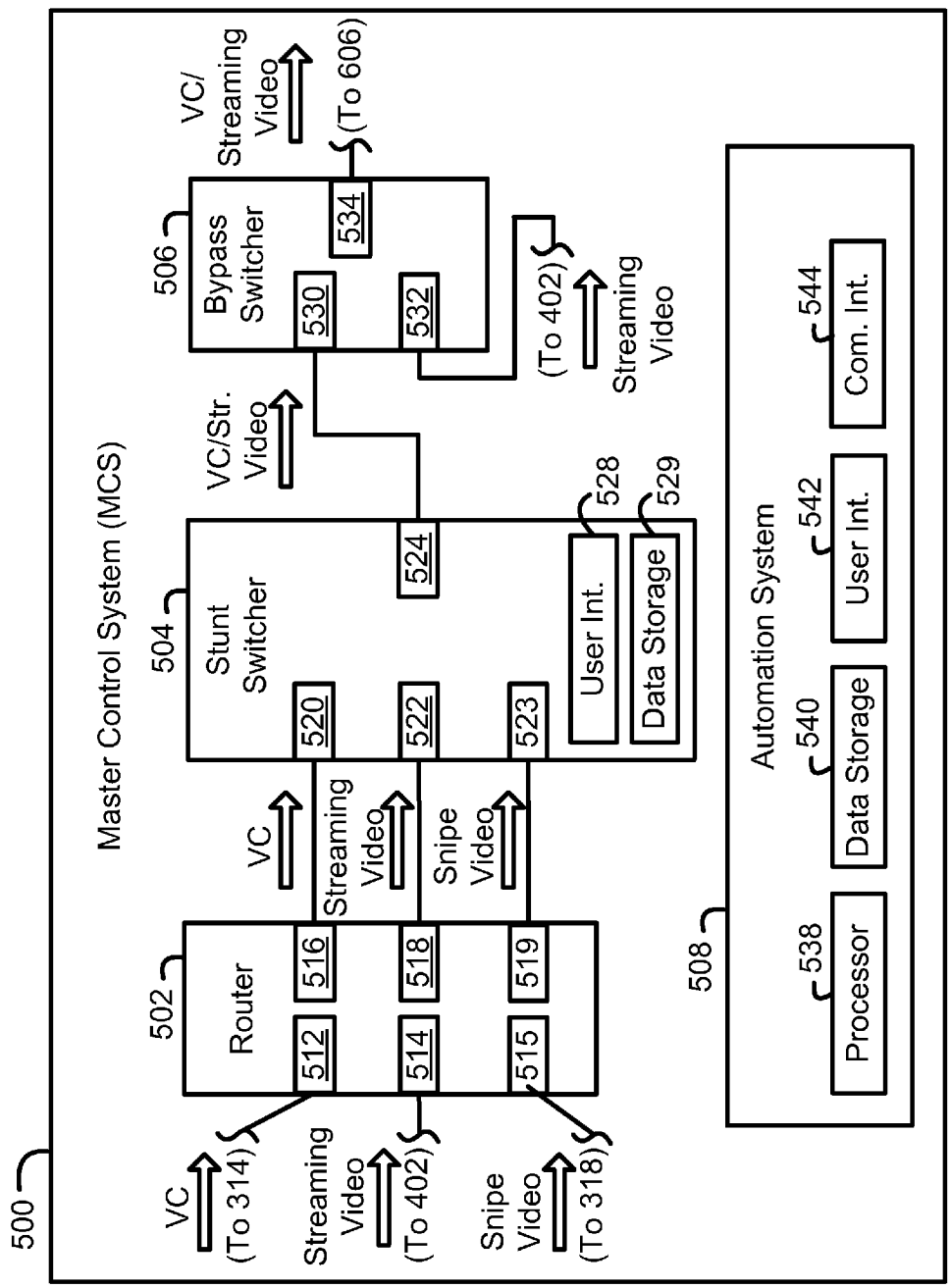
FIG. 5 is a simplified block diagram of an example master control system.

FIG. 5 shows the MCS 500 in greater detail. The MCS 500 may be configured to receive video, channel the video through one or more sources, and send the video to the air-chain system 600 for broadcast. In one example, the MCS 500 includes a router 502, a stunt switcher 504, a bypass switcher 506, and an automation system 508, each of which may be connected to each other by a connection mechanism (not shown).

1. Router

The router 502 may be configured to channel video by mapping inputs to outputs, and may include one or more inputs, including for example, a first input 512, a second input 514, and a third input 515, and one or more outputs, including for example, a first output 516, a second output 518, and a third output 519. The router 502 may also include a communication interface (not shown). The inputs 512, 514, 515, the outputs 516, 518, 519 and the communication interface may each be connected to each other by a connection mechanism (not shown). Notably, a router may and often does have more inputs than outputs such that it may connect many sources to relatively fewer destinations.

The first RAPD 302 may be connected to the router 502 via the output 314 and the input 512. The SVS 400 may be connected to the router 502 via the output 402 and the input 514. The second RAPD 303 may be connected to the router 502 via the output 318 and the input 515. An example of a router is the Blackmagic Design Videohub provided by Blackmagic Design Pty. Ltd. Of Fremont, Calif.

2. Stunt Switcher

The stunt switcher 504 may be configured to channel video by mapping inputs to outputs, and may include one or more inputs, including, for example, a first input 520, a second input 522, and a third input 523, and one or more outputs, including, for example, an output 524. The stunt switcher 504 may also include a user interface 528, a data storage 529, and a communication interface (not shown).

The inputs 520, 522, 523, the output 524, the user interface 528, the data storage 529, and the communication interface may each be connected to each other by a connection mechanism (not shown). The router 502 may be connected to the stunt switcher 504 via the output 516 and the input 520, via the output 518 and the input 522, and via the output 519 and the input 523. Like a router, a stunt switcher may and often does have more inputs than outputs such that it may connect many sources to relatively fewer destinations. An example of a stunt switcher is the Miranda NVISION NVS5100MC provided by NVision, Inc. of Coppell, Tex.

The stunt switcher 504 may further be configured to perform various functions related to DVEs. A DVE is an effect module (e.g., in the form of a set of program instructions) that is configured to be executed or "run." When run, a DVE dynamically manipulates video being channeled through the stunt switcher. Running a DVE may involve using one or more layers known as "keys" to overlay graphics, video, or other media on video. In some instances, running a DVE may involve simply "resetting" the keys, thereby removing any media being overlayed as a result of another DVE being run.

The stunt switcher 504 may be configured to assist a user in designing a DVE, such as via the user interface 528. Once a DVE is designed, the stunt switcher 504 may store the DVE in the data storage 529. In one example, the stunt switcher may store DVEs in respective DVE registers within the data storage 529. The stunt switcher 504 may also store media used in connection with the DVE in the data storage 529. This allows the stunt switcher 504 to retrieve media as needed. For example, when running a DVE, the stunt switcher 504 may retrieve media from a particular graphic or video register in the data storage 529 as indicated by the DVE. Media may be stored in the data storage 529 in a variety of manners, such as via a file transfer protocol (FTP). As such, by overwriting media stored in the data storage 529, the result of a DVE that is run may be changed.

Once a DVE is designed and stored in the data storage 529, the stunt switcher 504 may then retrieve and run the DVE. In some instances, this may occur in response to a request being received from a user (e.g., via the user interface 528) or from the automation system 508. Accordingly, when a stunt switcher runs a DVE, a VC that is being channeled through the stunt switcher 504 may be dynamically manipulated. This manipulated video may then be sent through the bypass switcher 506 and to the air-chain system 600 for broadcast as described in greater detail below.

In some instances, media used in connection with a DVE may be stored in another location and sent to the stunt switcher 504 as needed. For example, a snipe video used in connection with a snipe-overlay DVE may be stored in the data storage 304 of the RAPS 300, and the automation system 508 may cause the second RAPD 303 to retrieve the snipe video and send it to the stunt switcher 504 via the router 502. As noted above, a snipe-overlay DVE is configured to overlay snipe video on underlying video such as a VC. As such, the snipe-overlay DVE may be configured to (when run) receive the snipe video from a particular input of the stunt switcher (as indicated by the DVE) and overlay the snipe video on the underlying video as the underlying video is being channeled through the stunt switcher 504

Another example type of DVE is a snipe-removal DVE. A snipe-removal DVE is configured to (when run) remove an overlayed snipe video. In some instances, a snipe-removal DVE may simply "reset" all keys such that no overlaying media or other effects remain, thereby ensuring that any overlayed snipe is removed from the underlying video as a remainder of the underlying video is being channeled through the stunt switcher.

3. Bypass Switcher

The bypass switcher 506 may be configured to channel video by mapping inputs to outputs. The bypass switcher 506 may include at least one input including, for example, a first input 530 and a second input 532, and at least one output including, for example, an output 534. The bypass switcher 506 may also include a communication interface (not shown). The inputs 530, 532, the output 534, and the communication interface may all be connected to each other by a connection mechanism (not shown). The stunt switcher 504 may be connected to the bypass switcher 506 via the output 524 and the input 530. A bypass switcher may and often does have multiple inputs and a single output such that it may connect many sources to relatively fewer destinations.

Accordingly, provided that the router 502, the stunt switcher 504, and the bypass switcher 506 all have the appropriate input-to-output mappings, a VC sent from the RAPD 302 to the MCS 500 may be channeled through the entities in the MCS and sent out the MCS. Likewise, provided that the router 502, the stunt switcher 504, and the bypass switcher 506 all have the appropriate input-to-output mappings, streaming video sent from the SVS 400 to the MCS 500 may be channeled through the entities in the MCS and sent out the MCS.

4. Automation System

The automation system 508 may be configured to perform or to cause performance of one or more functions related to the television-broadcasting system 100. The automation system 508 may include a processor 538, a data storage 540, a user-interface 542 (e.g., including a display device), and a communication interface 544, all of which may be connected by a connection mechanism (not shown). The processor 538 may include one or more general-purpose processors (e.g., microprocessors) and/or special-purpose processors (e.g., digital signal processors and/or application specific integrated circuits).

The data storage 550 may include one or more volatile and/or non-volatile storage components and may be integrated in whole or in part with the processor 538. The data storage 450 may take the form of a non-transitory computer-readable medium and may include a set of program instructions, that when executed by the automation system 508 (e.g., by the processor 538), cause performance of a set of functions. For example, the automation system 508 may cause the RAPS 300, the SVS 400, the MCS 500, the air-chain system 600, an entity included therein, and/or another entity to perform one of more of the functions described in this disclosure. The automation system 508 may cause such functions to be performed by sending instructions and/or other data via a corresponding communication interface and/or connection mechanism to the appropriate device.

The automation system 508 may receive data via the same path. In one example, the automation system 508 sends and receives data according to a video disk control protocol (VDCP). For example, the automation system 508 may receive from the bypass switcher 506, an indication of the input-to-output mappings used by the bypass switcher such that the automation system may determine whether the scheduled video was actually sent to the air-chain system for broadcast. The automation system 508 may use these indications to generate an as-run log, which is a report of what was actually broadcast.

Figure 6:
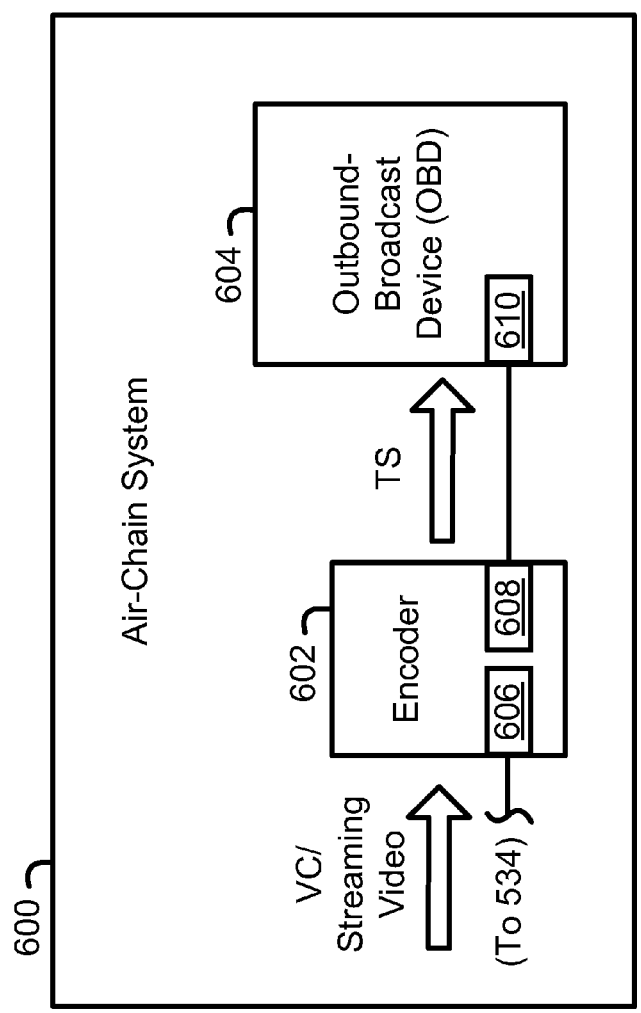
FIG. 6 is a simplified block diagram of an example air-chain system.

In some instances, the automation system 508 may perform functions described herein as being performed by the traffic system 200. Likewise, in some instances, the traffic system 200 may perform functions described herein as being performed by the automation system 508. This may be the case, for example, where the traffic system 200 and the automation system 508 operate using a "live log" approach, where the traffic system 200 may be configured to query the automation system 508, manage the log and make scheduling-related decisions itself, and provide log entries (perhaps one at a time) to the automation system for processing E. Air-Chain System FIG. 6 shows the air-chain system 600 in greater detail. The air-chain system 600 may be configured to prepare and broadcast video received from the MCS 500 to an audience. The air-chain system 600 may include an encoder 602 and an outbound-broadcast device (OBD) 604.

The encoder 602 may be configured to receive video from a source entity, generate a transport stream (TS) (that includes the video), and send the generated TS to a destination entity. The TS may be described as including video, meaning that the TS includes the encoded representation of the video, among other things. The encoder 602 may include an input 606 and an output 608, each of which may be connected by a connection mechanism (not shown). The bypass switcher 506 may be connected to the encoder 602 via the output 534 and the input 606.

In one example, the encoder 602 may generate a TS by, among other things, encoding video based on the HD-SDI standard to video based on the MPEG 2 standard. An example of an encoder is the NetVX provided by Harris Corporation of Melbourne, Fla.

The OBD 604 may be configured to receive a TS from a source entity, and broadcast the TS (i.e., including video) to multiple destination entities for viewing by an audience. The OBD 604 may include an input 610, and the encoder 602 may be connected to the OBD via the output 608 and the input 610.

It should be noted that the term television-broadcast as used in this disclosure refers broadly to the distribution of video to an audience, and is not meant to be limited to distribution of video in any particular manner. Accordingly, the OBD 604 may take the form of a transmitter, satellite, or terrestrial fiber transmitter (e.g., any of which may correspond with a service provider). As another example, the OBD 604 may also take the form of a network connection (e.g., for broadcasting the TS to an audience via the Internet).

The television-broadcasting system 100 described above is one non-limiting example. Indeed, the disclosed systems may include some or all of the entities discussed above, and may be arranged in different ways as would be apparent to one of ordinary skill in the art.

III. Example Methods

Figure 7A:
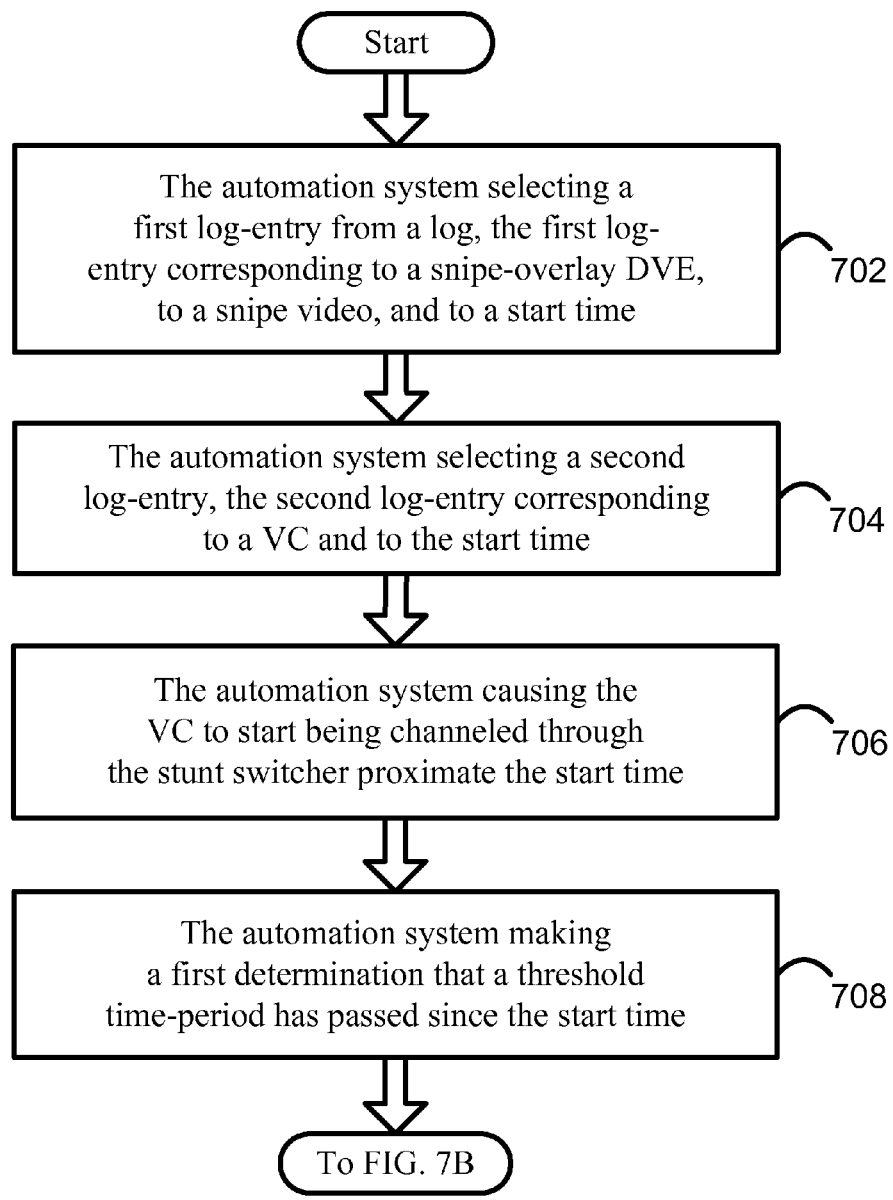
FIG. 7A shows a first part of a flow chart illustrating functions in accordance with an example method.
Figure 7B:
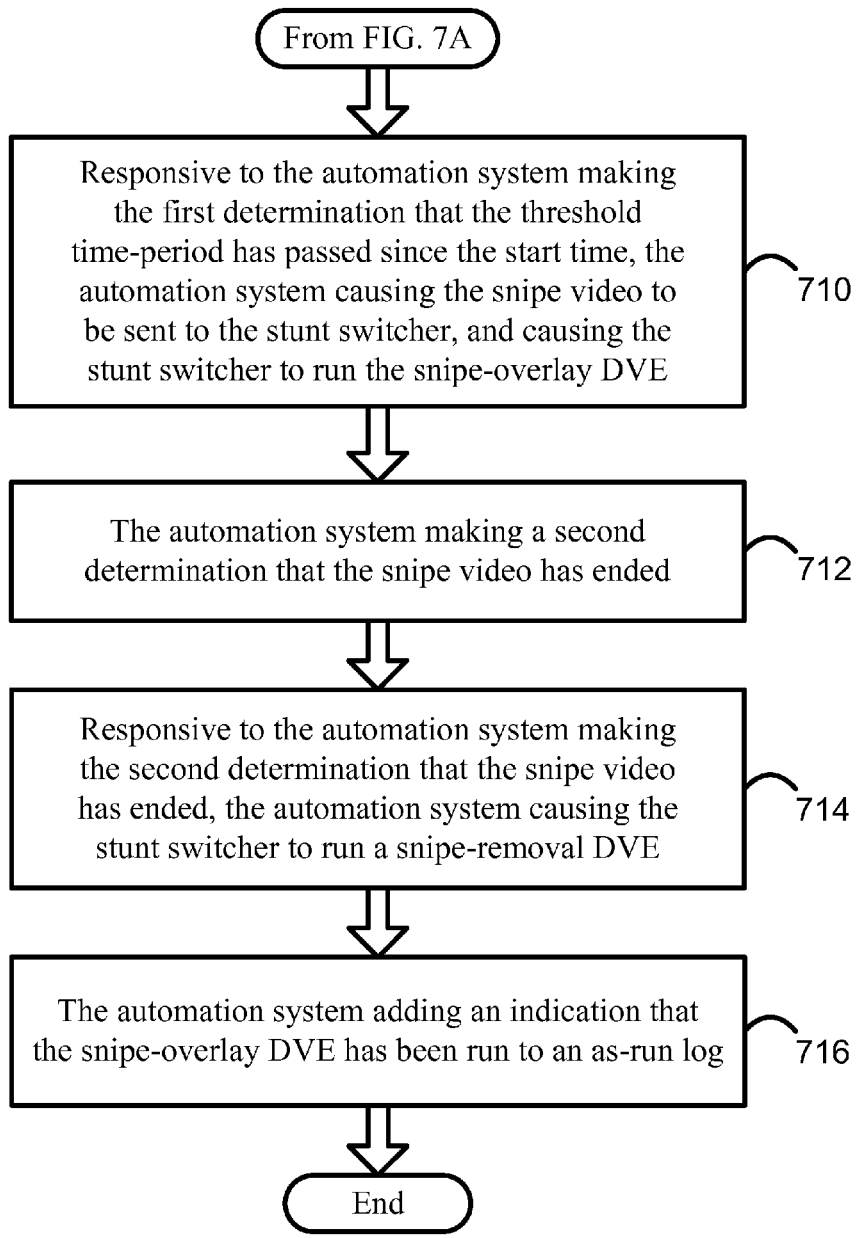
FIG. 7B shows a second part of the flow chart of FIG. 7A.

FIGS. 7A and 7B show a flow chart illustrating functions in accordance with an example method. At block 702, the method may involve the automation system 508 selecting (i.e., retrieving or accessing) a first log-entry from a log. Unlike a typical log-entry that corresponds to a VC, the first log-entry corresponds to a snipe-overlay DVE that is stored in the data storage 529 of the stunt switcher 504. Further, the first log-entry corresponds to a snipe video for use in connection with the snipe-overlay DVE. As discussed above, the snipe video may be stored in the data storage 304. This may allow the automation system 508 to cause the RAPD 303 to retrieve the snipe video and send it to the stunt switcher 504 via the router 502. An example manner in which the first log-entry may correspond to both the snipe-overlay DVE and the snipe video is described in greater detail below. The first log-entry may also correspond to a start time (e.g., as represented by an absolute, calculated or manual start time stored in a start-time field of the first log-entry).

The automation system 508 may select the first log-entry according to the corresponding start time. For example, if the first log entry includes a start time represented as an absolute start time, the automation system 508 may select the first log-entry at the absolute start time (e.g., when a current time matches the absolute start time). As another example, if the first log-entry includes a start time represented as a calculated start time, the automation system 508 may select the first log-entry when the preceding log entry gets "completed" (i.e., when the VC of the previous log entry has played for its corresponding duration). As yet another example, if the first log-entry includes a manual start time, the automation system 508 may select the first log-entry in response to receiving a request (e.g., from a user) to select the first log-entry. Notably, in some instances the automation system 508 may select the first log-entry "ahead of schedule" (e.g., three hours before the start time). This may allow the automation system 508 and/or another entity to perform or prepare to perform certain functions in advance of the start time.

The first log-entry may also include a duration (e.g., in a duration field of the first log-entry). However, since the first log-entry does not correspond to a VC, but rather to a snipe-overlay DVE, the first log-entry may include a zero duration. As a result, the automation system 508 does not "pause" on the first log-entry when traversing the log (as it would for a log-entry that corresponds to a VC). In some instances, a traffic system may be configured to prevent use of a log entry having a zero duration. In such instances, it may be desired to configure the first log-entry with a nominal duration (e.g., one second) such that the traffic system deems the first log-entry acceptable.

At block 704, the method may involve the automation system 508 selecting a second log-entry from the traffic log. The second log-entry may correspond to a VC. In one example, the second log-entry includes a house identifier (e.g., stored in a house-identifier field of the log entry) that maps to the VC. The automation system 508 may select the second log-entry in a manner similar to that of the first log-entry.

The second log-entry may also correspond to the start time. Therefore, both the first and second log-entries may correspond to the same start time. For example, both the first and second log-entries may have the same absolute start time (e.g., stored in respective start-time fields). Alternatively, the second log-entry may have a calculated start time and may be the next log entry after the first log-entry to have a non-zero duration. As such, the first and second log-entries correspond to the same time. In another example, the first log-entry has a manual start time and the second log-entry has a calculated start time. Again, in this instance, the first and second log-entries correspond to the same start time (i.e., the time when the manual start request is received).

The second log entry may also include a duration. The duration indicates the duration of the VC, and therefore the duration is a non-zero duration. This results in the automation system 508 "pausing" on the second log-entry for the duration of the VC (i.e., for the duration of the VC recorded in the RAPD 302).

At block 706, the method may involve the automation system 508 causing the VC to start being channeled through the stunt switcher 504 proximate (i.e., at or near) the start time. For example, the automation system 508 may cause the RAPD 302 to retrieve the VC, channel it through the MCS 500 (and the included stunt switcher 504) and send it to the air-chain system 600 for broadcast. Since the RAPD retrieving the VC may take a few seconds, the automation system 508 may begin performing the related functions in advance of the start time such that the VC is channeled through the stunt switcher 504 proximate the start time.

At block 708, the method may involve the automation system 508 making a first determination that a threshold time-period has passed since the start time. At block 710, the method may involve responsive to the automation system 508 making the first determination that the threshold time-period has passed since the start time, the automation system causing the snipe video to be sent to the stunt switcher 504. For example, the automation system 508 may cause the second RAPD 303 to send the snipe video to the stunt switcher 504 via the router 502. Further in response to the automation system 508 making the first determination, the automation system 508 may cause the stunt switcher 504 to run the stored snipe-overlay DVE (that may indicate the input of the stunt switcher 504 where the snipe video is being received). As a result, the automation system 508 may overlay the snipe video on the VC as the VC is being channeled through the stunt switcher 504.

The threshold time-period may therefore dictate when the snipe-overlay DVE is run, and may be set (e.g., by a user) as desired. For example, by setting the threshold time-period as fifteen seconds, the automation system 508 may cause the stunt switcher 504 to run the snipe-overlay DVE fifteen seconds after the VC starts being channeled through the stunt switcher, and therefore approximately fifteen seconds into the VC as it is being broadcast. As such, the second log-entry may cause the VC to be broadcast, and the first log-entry may cause a snipe-overlay DVE to be run that dynamically manipulates the VC as the VC is being broadcast.

In one example, the automation system 508 causing the snipe video to be sent to the stunt switcher 504 may involve the automation system sending a request to the RAPS 300 to send the snipe video to the stunt switcher (according to a protocol understood by the RAPS 300), which in turn causes the RAPD 303 to retrieve and send the snipe video to the stunt switcher 504 via the router 502. Likewise, in one example, the automation system 508 causing the stunt switcher 504 to run the snipe-overlay DVE may involve the automation system sending a request to the stunt switcher 504 to run the snipe-overlay DVE (according to a protocol understood by the stunt switcher). In some instances, a parameter may be included in the log entry (e.g., in the one or more auxiliary-notation fields) that may be used to identify and/or configure the snipe-overlay DVE.

At block 712, the method may involve the automation system 508 making a second determination that the snipe video has ended (i.e., when the snipe video has been played for its duration). At block 714, the method may involve responsive to the automation system 508 making the second determination that the snipe video has ended, the automation system causing the stunt switcher 504 to run a snipe-removal DVE (e.g., stored in the data storage 529). Therefore, once the snipe video ends, the automation system 508 may effectively cause the snipe-overlay DVE to terminate. This ensures that the overlayed snipe video is removed from the VC as a remainder of the VC is being channeled through the stunt switcher (i.e., after the snipe video has ended).

In some instances, it may be desired to track when the snipe video has been overlayed on the underlying video. This may be particularly useful in connection with certain types of snipe videos, namely ones that involve advertisements that may be need to be tracked for billing purposes. As such, at block 716, the method may involve the automation system 508 adding an indication that the snipe-overlay DVE (and/or a snipe-removal DVE) has been run to an as-run log. In one example, the automation system 508 may further indicate how long the particular snipe video was overlayed on video being broadcast, and/or the particular time when the overlaying occurred.

In one example, the first log-entry may include an identifier that maps to a set of scripts (or other program instructions), such as PHP-Hypertext-Preprocessor (PHP) scripts, that when executed by the automation system 508 cause the automation system to perform one or more of the functions, such as those at blocks 708-714 as described above. Notably, other types of scripts may also be used, including for example customized scripts that are configured to perform functions in a television-broadcasting environment. Such scripts may be executed by a corresponding interpreter installed in the automation system 508. In one example, the identifier may be stored in a house-identifier field of the first log-entry. The identifier may have a particular property (e.g., a predefined prefix) to allow the automation system 508 to differentiate between the identifier and a house identifier that is typically included in a house-identifier field (e.g., as with the second log-entry described above). As such, responsive to the automation system 508 determining that the first log-entry includes the identifier, the automation system 508 may execute the set of scripts and therefore, perform the corresponding functions. In one example, the automation system 508 may begin executing the set of scripts proximate the start time or perhaps in advance of the start time such that the second RAPD 303 has sufficient time to retrieve and start sending the snipe video to the stunt switcher 504 proximate the start time.

A further description of the manner in which an automation system 508 may use the identifier to trigger execution of the set of scripts is described in cross-referenced U.S. patent application Ser. No. 13/828,682, entitled "Systems and Methods for Causing a Stunt Switcher to Run a DVE."

In view of the discussion above, an example set of scripts is provided below (parameter descriptions are shown inside arrow brackets):

WAIT (<time period>);
LOAD_AND_ROUTE (<snipe-video house-identifier>, <snipe-video token>, <stunt-switcher key-identifier>, <stunt-switcher identifier>);
RUN_EFFECT_PLAY_RUN_EFFECT (<snipe-overlay DVE identifier>, <snipe-video token>, <snipe-removal DVE identifier>, <stunt-switcher identifier>);
EXIT.

The "WAIT (<time period>)" command may cause the automation system 508 to wait for a predetermined time-period. For example, a "WAIT (450)" command may cause the automation system 508 to wait for a time period equal to 450 frames (i.e., until 450 frames after the start time). As such, in one example, the automation system 508 making a determination that a threshold time-period has passed since the start time may involve the automation system determining that a wait period has passed. However, a variety of other timing techniques may be used.

The "LOAD_AND_ROUTE (<snipe-video house-identifier>, <snipe-video token>, <stunt-switcher key-identifier>, <stunt-switcher identifier>)" command may cause the automation system 508 to cause a snipe video to be loaded and routed (sent) to an appropriate input that maps to the stunt-switcher key-identifier such that the snipe video may be used in connection with a snipe-overlay DVE. The snipe-video house-identifier may function like a traditional house-identifier, except that it maps to a snipe video rather than a VC. The snipe-video token may be used as an identifier such that other scripts (such as the "RUN_EFFECT_PLAY_RUN_EFFECT" script described below) may refer to the snipe video without identifying a particular physical input of the stunt switcher 504. The stunt-switcher key-identifier and the stunt-switcher identifier collectively identify a particular key of a particular stunt switcher that the snipe video will use. For example, a "LOAD_AND_ROUTE (AB1234, T, key1, 504)" command may cause the automation system 508 to load the snipe video mapped to by AB1234 in the RAPD 303 such that it may send the snipe video (via the router 502) to an input of the stunt switcher 504 that maps to the key identified as key1. The automation system 508 may then use the token T to refer to the loaded snipe video that will be sent in this manner.

The "RUN_EFFECT_PLAY_RUN_EFFECT (<snipe-overlay DVE identifier>, <snipe-video token>, <snipe-removal DVE identifier>, <stunt-switcher identifier>)" command may cause the automation system 508 to cause a stunt switcher to run a snipe-overlay DVE that uses the loaded snipe video. Further, once the snipe video ends, the automation system 508 may cause the stunt switcher to run a snipe-removal DVE. The snipe-overlay DVE identifier identifies the snipe-overlay DVE to run, and the snipe-video token identifies the loaded snipe video to use in connection with the snipe-overlay DVE. The snipe-removal DVE identifier identifies the snipe-removal DVE to run once the snipe video ends. The stunt-switcher identifier identifies the stunt switcher that should run the snipe-overlay and snipe-removal DVEs, and that should receive the snipe video.

For example, the command "RUN_EFFECT_PLAY_RUN_EFFECT (50, 51, 504, T) may cause the automation system 508 to cause the stunt switcher 504 to run a snipe-overlay DVE identified as DVE 50 (stored in the data storage 529). Further, the command may cause the automation system 508 to use in connection with the snipe-overlay DVE, the snipe video routed in accordance with the "LOAD_AND_ROUTE" command described above, and referred to by the snipe-video token T. Then, once the snipe video ends, the automation system 508 may cause the stunt switcher 504 to run the snipe-removal DVE identified as DVE 50.

The "EXIT" command may terminate the automation system's 508 execution of the set of scripts.

The set of scripts may also be used to perform other functions, including for example adding an indication that the snipe-overlay DVE (and/or a snipe-removal DVE) has been run to an as-run log as described above. Further, the scripts may provide a "time out" period and a corresponding action to handle an instance in which the set of scripts runs for longer than the time out period. For example, the action may involve simply terminating execution of the set of scripts.

By using an identifier that maps to a set of scripts in the manner described above, a user (e.g., a traffic manager) may include an appropriate identifier in a traffic entry of the log to easily cause a stunt switcher to run a snipe-overlay DVE after a delay and then run a snipe-removal DVE after another delay) as configured in the corresponding set of scripts. In one example, the second log-entry may be positioned as the next log-entry after the first log entry to have a non-zero duration. For example the log may include the first log-entry followed immediately by the second log-entry. Since both log entries have the same start time, the automation system 508 may perform functions related to both log entries simultaneously, or perhaps contemporaneously. For example, the automation system 508 may cause a VC to be channeled through the stunt switcher 504, while simultaneously executing a set of scripts. As the set of scripts execute, the corresponding functions may be performed, and therefore a snipe video may be overlayed on the VC, and then removed.

Further, since a snipe-overlay DVE may correspond to a house number, the snipe video need not be available at the time the log is created, but need only be received by the time the automation system 508 causes the snipe-overlay DVE to be run.

Figure 8A:
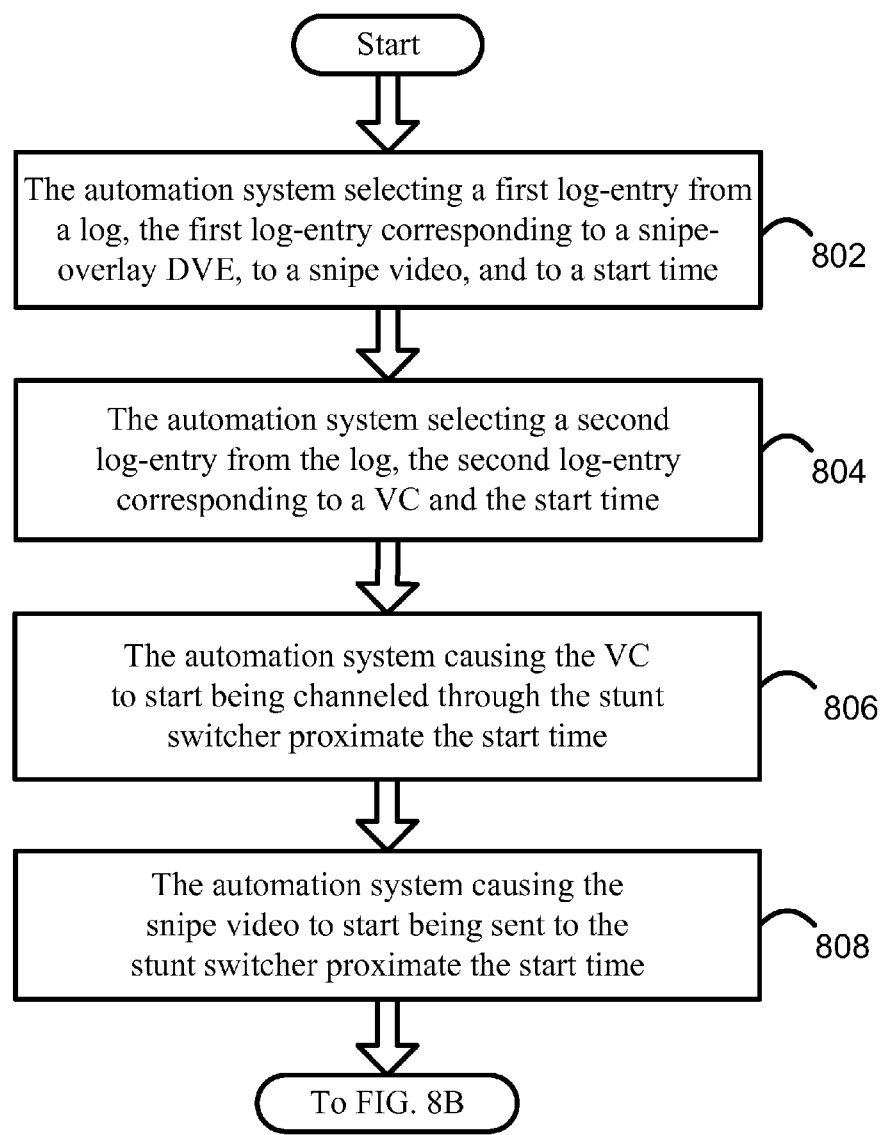
FIG. 8A shows a first part of a flow chart illustrating functions in accordance with another example method.
Figure 8B:
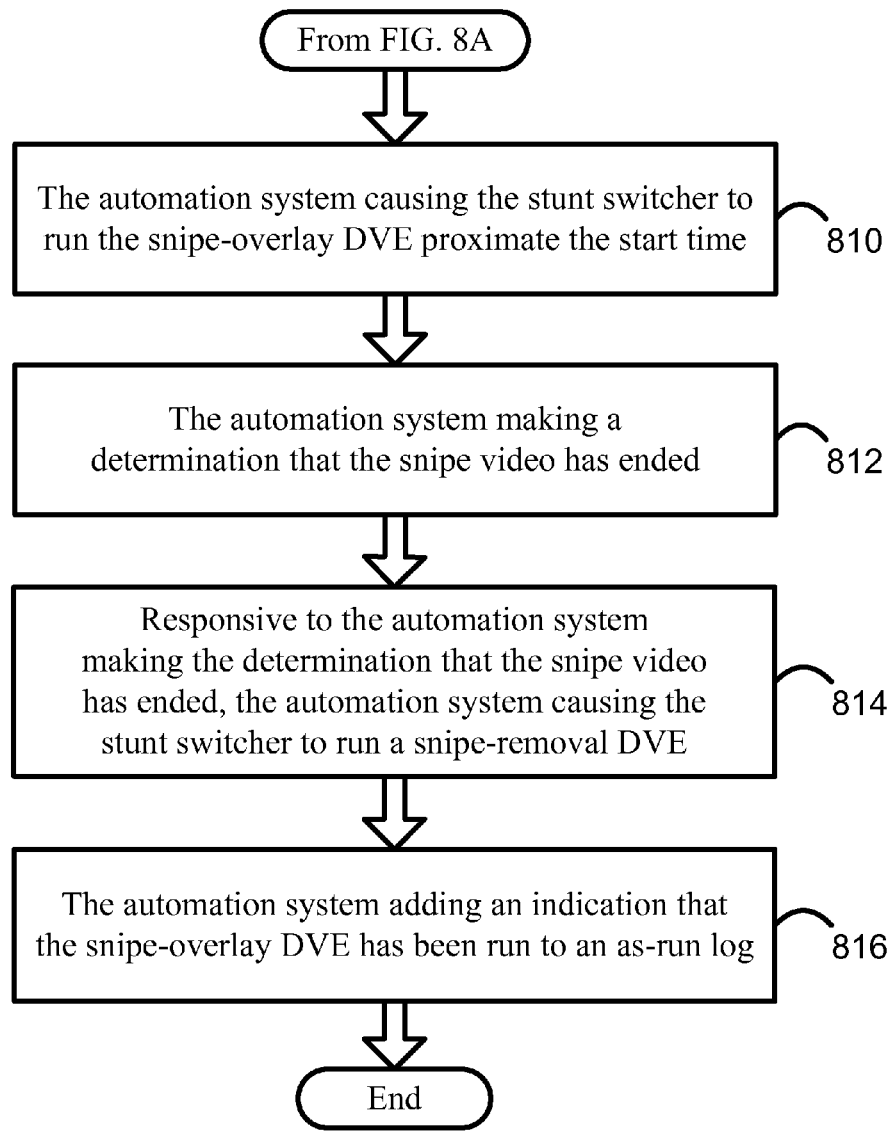
FIG. 8B shows a second part of the flow chart of FIG. 8A.

As a variation on the example method provided above, the automation system 508 may cause the stunt switcher 504 to run the snipe-overlay DVE simultaneously as it causes the VC to start being channeled through the stunt switcher. FIGS. 8A and 8B show a flow chart illustrating functions in accordance with another example method that employs such a variation.

At block 802, the method may involve the automation system 508 selecting a first log-entry from a log. Again, the first log-entry may correspond to a snipe-overlay DVE stored in the stunt switcher 504, to a snipe video, and to a start time. At block 804, the method may involve the automation system 508 selecting a second log-entry from the log. Again, the second log-entry may correspond to a VC and the start time. At block 806, the method may involve the automation system 508 causing the VC to start being channeled through the stunt switcher 504 proximate the start time. At block 808, the method may involve the automation system 508 causing the snipe video to start being sent to the stunt switcher proximate the start time. At block 810, the method may involve the automation system 508 causing the stunt switcher 504 to run the stored snipe-overlay DVE proximate the start time. Therefore, the automation system 508 may overlay the snipe video on the VC as the VC is being channeled through the stunt switcher 504.

At block 812, the method may involve the automation system 508 making a determination that the snipe video has ended (i.e., when the snipe video has been played for its duration). At block 814, the method may involve responsive to the automation system 508 making the determination that the snipe video has ended, the automation system causing the stunt switcher 504 to run a snipe-removal DVE. At block 816, the method may involve the automation system 508 adding an indication that the snipe-overlay DVE (and/or the snipe-removal DVE) has been run to an as-run log. Such functions may be performed by way of an identifier that maps to them as described above.

Figure 9A:
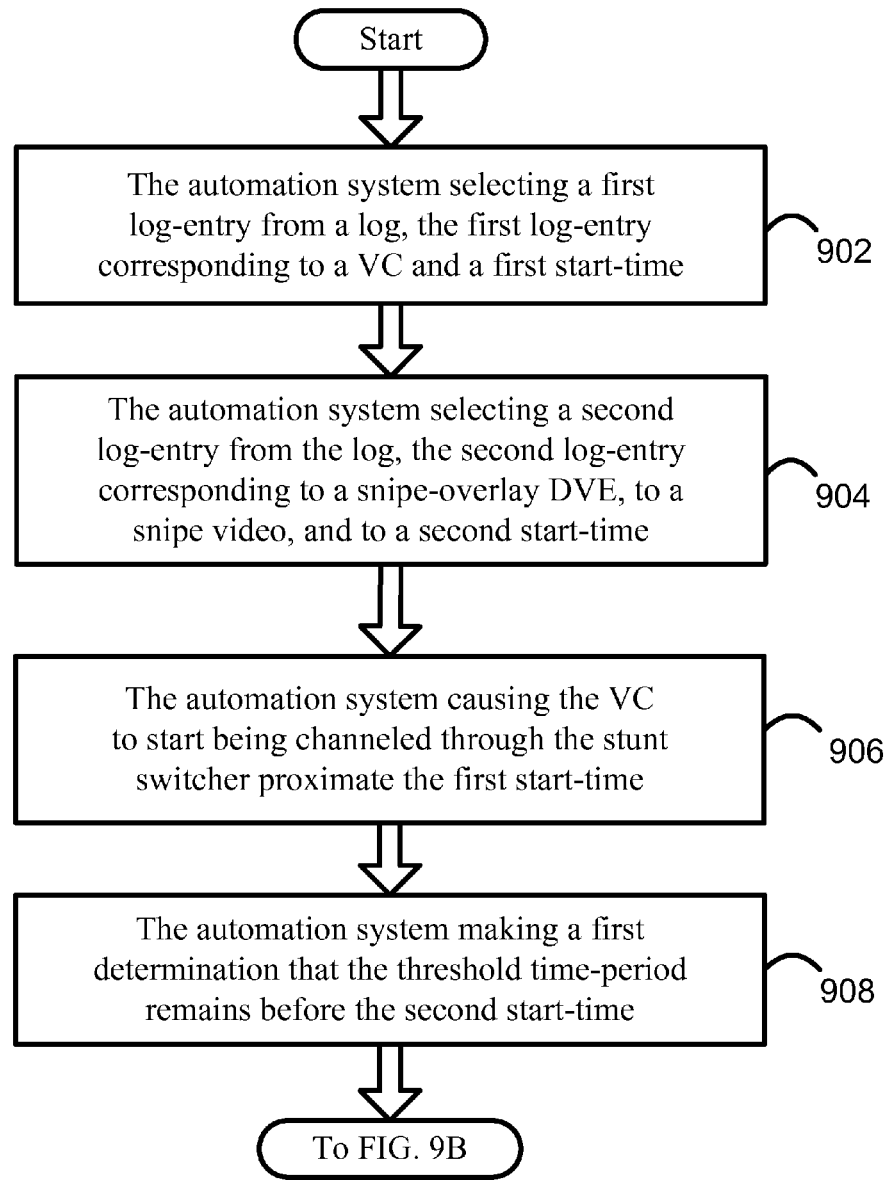
FIG. 9A shows a first part of a flow chart illustrating functions in accordance with another example method.
Figure 9B:
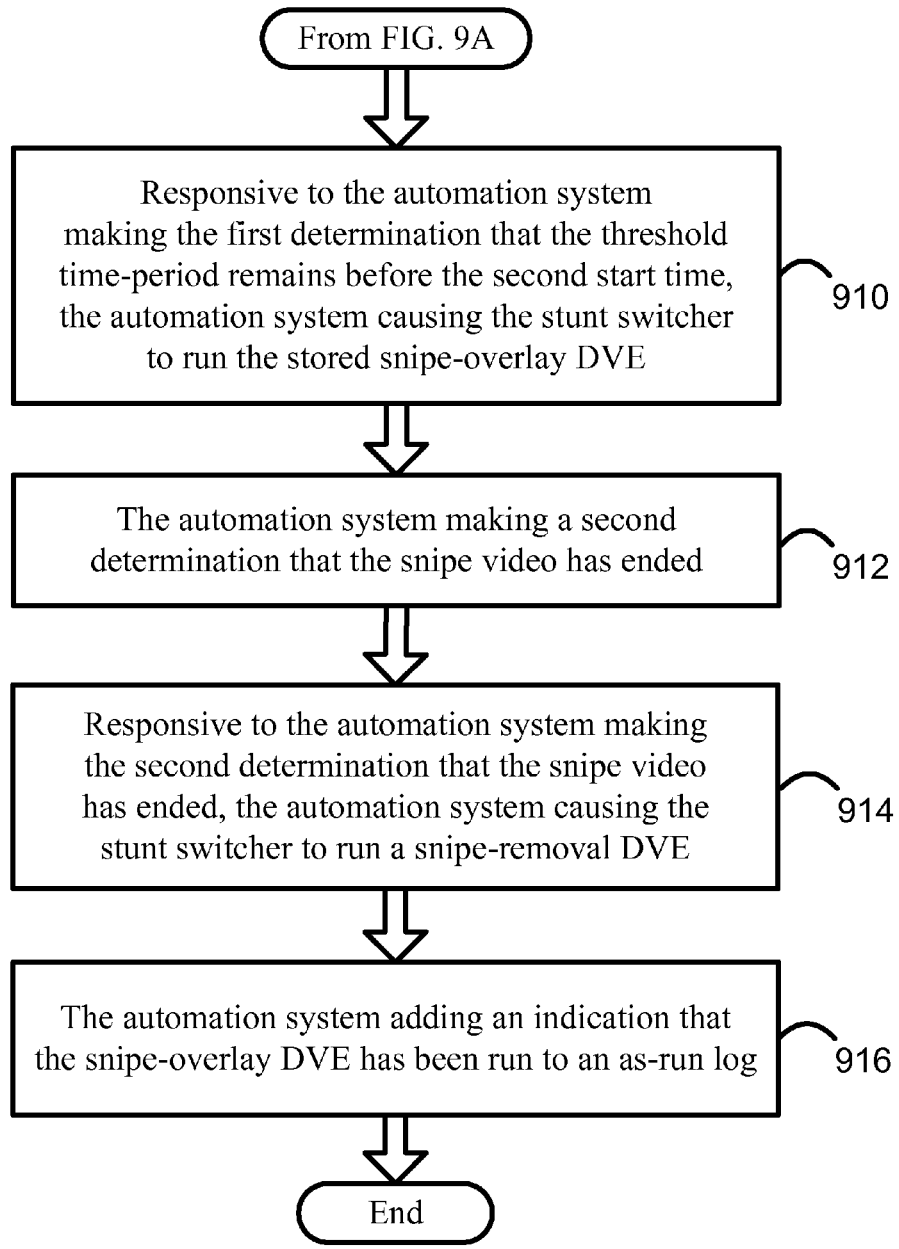
FIG. 9B shows a second part of the flow chart of FIG. 9A.

As another variation on the example methods provided above, the time in which the snipe-overlay DVE is run may be calculated based on a negative offset from a start time of another log entry. FIGS. 9A and 9B show a flow chart illustrating functions in accordance with another example method that employs such a variation.

At block 902, the method may involve the automation system 508 selecting a first log-entry from a log. The first log-entry may correspond to a VC and to a first start-time. In one example, the first start-time may be determined in response to the automation system receiving a request to start channeling the VC through the stunt switcher 504 (i.e., the first log-entry may include a manual start time indicator in a start-time field). The first log-entry may also include a duration. The duration indicates the duration of the VC, and therefore the duration is a non-zero duration.

At block 904, the method may involve the automation system 508 selecting a second log-entry from the log. The second log-entry may correspond to a snipe-overlay DVE stored in the stunt switcher, and to a snipe video for use in connection with the snipe-overlay DVE. Further, the second log-entry may correspond to a second start-time. In one example, the second start time is later than the first start time, and therefore the second log-entry is positioned after the first log-entry in the log. The second log-entry may also include a duration. However, since the second log-entry does not correspond to a VC, but rather to a snipe-overlay DVE, the second log-entry may include a zero duration.

At block 906, the method may involve the automation system 508 causing the VC to start being channeled through the stunt switcher proximate the first start-time. At block 908, the method may involve the automation system 508 making a first determination that a threshold time-period remains before the second start-time. This target time (i.e., a where the threshold time-period remains before the second start-time), may therefore be described as a negative offset of the second start-time.

At block 910, the method may involve responsive to the automation system 508 making the first determination that the threshold time-period remains before the second start-time, the automation system 508 causing the snipe video to be sent to the stunt switcher 504 (e.g., at the target time). Further in response to the automation system 508 making the first determination, the automation system 508 may cause the stunt switcher 504 to run the stored snipe-overlay DVE (e.g., at the target time). As a result, the automation system 508 may overlay the snipe video on the VC as the VC is being channeled through the stunt switcher 504.

The negative offset may therefore dictate when the snipe-overlay DVE is run, and may be set (e.g., by a user) as desired. For example, by setting the negative often as thirty seconds, the automation system 508 may cause the stunt switcher 504 to run the snipe-overlay DVE thirty seconds before the end of the VC as it is being broadcast. As such, the first log-entry may cause the VC to be broadcast, and the second log-entry may cause a snipe-overlay DVE to be run that dynamically manipulates the VC as the VC is being broadcast.

At block 912, the method may involve the automation system 508 making a second determination that the snipe video has ended. At block 914, the method may involve responsive to the automation system 508 making the second determination that the snipe video has ended, the automation system 508 causing the stunt switcher 504 to run a snipe-removal DVE. The time at which the snipe removal DVE may be configured in a manner similar to that described above in connection with the snipe-overlay DVE. At block 916, the method may involve the automation system 508 adding an indication that the snipe-overlay DVE (and/or a snipe-removal DVE) has been run to an as-run log.

Such functions may be performed by way of an identifier that maps to them as described above. Notably, as described above, the automation system 508 select log entries ahead of schedule. In the example provided above, the automation system 508 may select the second log-entry before the second start-time, such that it may perform appropriate actions that are timed according to the negative offset as described above.

IV. Example Variations

While one or more functions of the disclosed methods have been described as being performed by the certain entities (e.g., the automation system 508), the functions may be performed by any entity, such as those included in the television-broadcasting system 100 described above. Further, the described steps throughout this application need not be performed in the disclosed order, although in some examples, an order may be preferred. Also, not all steps need to be performed to achieve the desired advantages of the disclosed systems and methods, and therefore not all steps are required. Further, the variations described throughout this disclose may be applicable to any of the disclosed systems or methods.

Further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A method for use in a system having a stunt switcher, the method comprising:
   selecting a first log-entry from a traffic log, wherein the first log-entry corresponds to an overlay digital video effect (DVE) stored in the stunt switcher, to a first video, and to a start time;
   selecting a second log-entry from the traffic log, wherein the second log-entry corresponds to a second video and the start time;
   causing the second video to start being channeled through the stunt switcher proximate the start time;
   making a determination that a threshold time-period has passed since the start time; and
   responsive to making the determination that the threshold time-period has passed since the start time, (i) causing the first video to be sent to the stunt switcher, and (ii) causing the stunt switcher to run the stored overlay DVE.

2. The method of claim 1, wherein the first log-entry includes a zero duration and wherein the second log-entry includes a non-zero duration.

3. The method of claim 1, wherein the second log-entry is the next log entry after the first log entry to have a non-zero duration.

4. The method of claim 1, wherein the first log-entry includes the start time represented as an absolute start time, and wherein the second log-entry includes the start time represented as the absolute start time.

5. The method of claim 1, wherein the first log-entry includes a house-identifier field and an identifier stored in the house-identifier field, wherein the identifier maps to a set of program instructions that when executed cause performance of the functions of (i) making the determination that the threshold time-period has passed since the start time, and (ii) responsive to making the determination that the threshold time-period has passed since the start time, causing the first video to be sent to the stunt switcher, and causing the stunt switcher to run the stored overlay DVE; and wherein the method further comprises responsive to determining that the first log-entry includes the identifier, executing the set of program instructions.

6. The method of claim 5, wherein the set of program instructions comprises a set of PHP-Hypertext-Preprocessor (PHP) scripts.

7. The method of claim 1, further comprising:
the stunt switcher running the stored DVE, thereby causing the stunt switcher to overlay the first video on the second video as the second video is being channeled through the stunt switcher.

8. The method of claim 7, wherein the determination is a first determination, the method further comprising:
making a second determination that the first video has ended; and
responsive to making the second determination that the first video has ended, causing the stunt switcher to run a removal DVE, thereby ensuring that the overlayed first video is removed from the second video as a remainder of the second video is being channeled through the stunt switcher.

9. The method of claim 1, further comprising:
adding an indication that the overlay DVE has been run to an as-run log.

10. A method for use in a system having a stunt switcher, the method comprising:
selecting a first log-entry from a traffic log, wherein the first log-entry corresponds to an overlay digital video effect (DVE) stored in the stunt switcher, to a first video, and to a start time;
selecting a second log-entry from the traffic log, wherein the second log-entry corresponds to a second video and the start time;
causing the second video to start being channeled through the stunt switcher proximate the start time;
causing the first video to start being sent to the stunt switcher proximate the start time; and
causing the stunt switcher to run the stored overlay DVE proximate the start time.

11. The method of claim 10, wherein the first log-entry includes a zero duration and wherein the second log-entry includes a non-zero duration.

12. The method of claim 10, wherein the second log-entry is the next log-entry after the first log entry to have a non-zero duration.

13. The method of claim 10, wherein the first log-entry includes the start time represented as an absolute start time, and wherein the second log-entry includes the start time represented as the absolute start time.

14. The method of claim 10, wherein the first log-entry includes a house-identifier field and an identifier stored in the house-identifier field, wherein the identifier maps to a set of program instructions that when executed cause performance of the functions of causing the first video to start being sent to the stunt switcher proximate the start time, and causing the stunt switcher to run the stored overlay DVE proximate the start time; and wherein the method further comprises responsive to determining that the first log-entry includes the identifier, executing the set of program instructions.

15. The method of claim 14, wherein the set of program instructions comprises a set of PHP-Hypertext-Preprocessor (PHP) scripts.

16. The method of claim 10, further comprising:
the stunt switcher running the stored DVE, thereby causing the stunt switcher to overlay the first video on the second video as the second video is being channeled through the stunt switcher.

17. The method of claim 16, wherein the determination is a first determination, the method further comprising:
making a second determination that the first video has ended; and
responsive to making the second determination that the first video has ended, causing the stunt switcher to run a removal DVE, thereby ensuring that the overlayed first video is removed from the second video as a remainder of the second video is being channeled through the stunt switcher.

18. The method of claim 10, further comprising:
adding an indication that the overlay DVE has been run to an as-run log.

19. A system comprising:
a stunt switcher; and
an automation system having a computer-readable medium including a set of program instructions, that when executed by the automation system, cause the automation system to perform a set of functions comprising:
selecting a first log-entry from a traffic log, wherein the first log-entry corresponds to an overlay digital video effect (DVE) stored in the stunt switcher, to a first video, and to a start time;
selecting a second log-entry from the traffic log, wherein the second log-entry corresponds to a second video and the start time;
causing the second video to start being channeled through the stunt switcher proximate the start time;
making a determination that a threshold time-period has passed since the start time; and
responsive to making the determination that the threshold time-period has passed since the start time, (i) causing the first video to be sent to the stunt switcher, and (ii) causing the stunt switcher to run the stored overlay DVE.

20. The system of claim 19, wherein the first log-entry includes a zero duration and wherein the second log-entry includes a non-zero duration.

21. The system of claim 19, wherein the set of functions further comprises:
adding an indication that the overlay DVE has been run to an as-run log.

22. The system of claim 19, wherein the first log-entry includes a house-identifier field and an identifier stored in the house-identifier field, wherein the identifier maps to a set of scripts that when executed cause performance of the functions of (i) making the determination that the threshold time-period has passed since the start time, and (ii) responsive to making the determination that the threshold time-period has passed since the start time, causing the first video to be sent to the stunt switcher, and causing the stunt switcher to run the stored overlay DVE; and wherein the set of functions further comprises responsive to determining that the first log-entry includes the identifier, executing the set of scripts.

23. A method for use in a system having a stunt switcher, the method comprising:
   selecting a first log-entry from a traffic log, wherein the first log-entry corresponds to a first video and to a first start-time;
   selecting a second log-entry from the traffic log, wherein the second log-entry corresponds to an overlay digital video effect (DVE) stored in the stunt switcher, to a second video, and to a second start-time;
   causing the first video to start being channeled through the stunt switcher proximate the first start-time;
   making a determination that a threshold time-period remains before the second start-time; and
   responsive to making the determination that the threshold time-period remains before the second start-time, (i) causing the second video to be sent to the stunt switcher, and (ii) causing the stunt switcher to run the stored overlay DVE.

24. The method of claim 23, wherein the first log-entry includes a non-zero duration and wherein the second log-entry includes a zero duration.

25. The method of claim 23, wherein the second log-entry is the next log entry after the first log entry.

26. The method of claim 23, wherein the first start-time is represented as a manual start time, and wherein the second start-time is represented as a calculated start time.

27. The method of claim 23, wherein the second log-entry includes a house-identifier field and an identifier stored in the house-identifier field, wherein the identifier maps to a set of program instructions that when executed cause performance of the functions of (i) making the determination that the threshold time-period remains before the second start-time, and (ii) responsive to making the determination that the threshold time-period remains before the second start-time, causing the second video to be sent to the stunt switcher, and causing the stunt switcher to run the stored overlay DVE; and wherein the method further comprises responsive to determining that the second log-entry includes the identifier, executing the set of program instructions.

28. The method of claim 27, wherein the set of program instructions comprises a set of PHP-Hypertext-Preprocessor (PHP) scripts.

29. The method of claim 23, wherein the determination is a first determination, the method further comprising:
   making a second determination that the second video has ended; and
   responsive to making the second determination that the second video has ended, causing the stunt switcher to run a removal DVE.

30. The method of claim 23, further comprising:
   adding an indication that the overlay DVE has been run to an as-run log.

31. The method of claim 23, further comprising:
   the stunt switcher running the stored DVE, thereby causing the stunt switcher to overlay the second video on the first video as the first video is being channeled through the stunt switcher.

* * * * *